Apr. 3, 1923.

H. E. TWITCHELL 1,450,314

ANTISKID CHAIN

Filed Sept. 5, 1922

Herbert E. Twitchell INVENTOR by John W. Dreher ATTORNEY.

Patented Apr. 3, 1923.

1,450,314

UNITED STATES PATENT OFFICE.

HERBERT E. TWITCHELL, OF HAMILTON, OHIO, ASSIGNOR OF ONE-HALF TO AUGUST KRIEGENHOFER, OF HAMILTON, OHIO.

ANTISKID CHAIN.

Application filed September 5, 1922. Serial No. 586,365.

*To all whom it may concern:*

Be it known that I, HERBERT E. TWITCHELL, a citizen of the United States, residing at the city of Hamilton, in the county of Butler and State of Ohio, have invented certain new and useful Improvements in Antiskid Chains, of which the following is a specification.

It is a well known fact that automobiles and motor cars of various kinds, skid when passing over slippery pavements, muddy or sandy roads, or streets; it is highly desirable, in fact, very necessary to overcome such tendency of the wheels to skid, and it is the object of my invention to entirely prevent or cut said tendency to skid.

My new anti-skid device is a simple unit in construction.

My new anti-skid device belongs to that class of these devices known as "individual anti-skid chains" and one or more may be used.

My anti-skid device does not injure the wheel, can be quickly placed in position and quickly removed, and will not readily get out of order; it is very simple in construction, is cheap of manufacture, and is highly efficient in use and possesses marked degree of utility.

One of the salient features consists in providing a body, base part, or yoke which passes over and onto the felly, rim or inside face of the wheel, and a chain part which passes around the tire or tread of the wheel, and which may be detachably connected to each end of the base part, or detachably connected at one end only, as will be found desirable in practice.

The various features and advantages will readily become apparent from the following specification.

Figure 1:
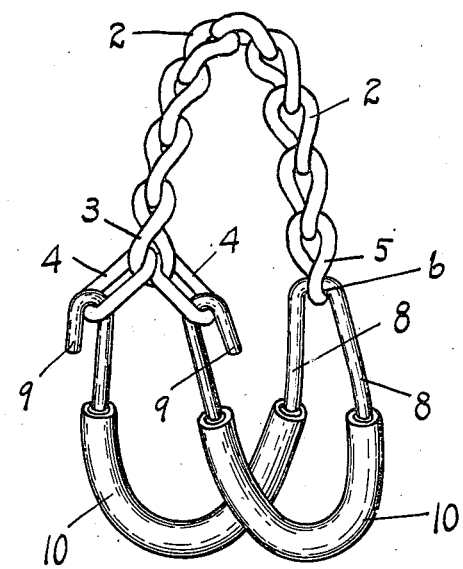
Fig. 1 is a perspective view of my nonskid chain, detached from the wheel.

In the drawing 2 represents a chain, made up of a multiplicity of links of the close twisted link type and may be formed of any style link best adapted for a non-skid chain element.

As shown in Fig. 1, at the loose end of the chain 2, the end twisted link 3 has two flat links as 4 attached and linked thereto. At its other end this chain 2, as shown in Fig. 1, is linked or connected by end link 5, to the closed end 6, of a body part or yoke 8, 8, which yoke at its opposite end terminates in end hooks 9, 9. On the yoke 8, 8, I attach a protecting surface 10 for protecting the felly 13.

Figure 2:
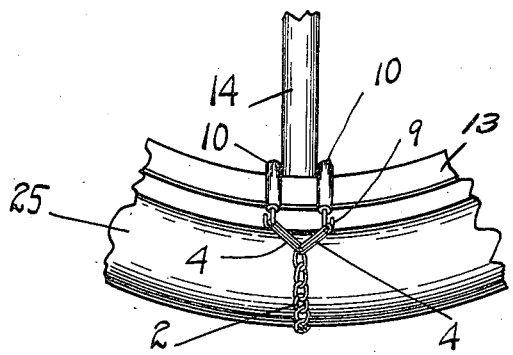
Fig. 2, is a side elevation of the same as applied to the wheel, parts of the wheel being broken away.

The yoke, formed of yoke parts or members 8, 8, rests on the felly 13, the protecting parts 10, 10, preventing injury to the felly, the yoke members 8, 8, passing on either side of the spoke 14, and lying in contiguity thereto, see particularly Fig. 2, the chain 2, engages the ends of the yoke parts 8, 8; at the closed end the link 5 is engaged and at the open part, the double links 4, 4, engage the hooks 9, 9, these links pulling the loose ends of the yoke formed of members 8, 8, together or toward each other so that a slight tension will result, so that the spoke 14 will be hugged to assist in linking the device in a desired dependable position; enough yielding motion being present so that the device will have sufficient play to save the parts from undue stress and injury and form a workable ideal condition for antiskid purposes.

It will be observed that my anti-skid device is a two part construction, one a felly engaging element and the other a tire engaging element for the wheel tread thereof, and means for directly engaging the tire tread means and the felly engaging element without the use of any extraneous connecting members.

While I have shown and described a preferred form in which I may use my invention, I wish to be understood as claiming any modified forms thereof which fall within the scope of this specification.

What I claim as new and my invention and desire to secure by Letters Patent is:

An anti-skid device for use with vehicle wheels, composed of a felly engaging element and a tire tread engaging element only, the tire tread engaging element consisting of a single length of chain provided at one end with two links which are connected to a link at one end of the chain, the felly engaging element being substantially V-shaped in plan and having two legs, each leg terminating in a hook, the closed end of said felly engaging element extending through a link at the other end of the chain, and said hooks being interlocked with said two links at the first mentioned end of the chain, said two links diverging from the end of the chain to said hooks.

In testimony whereof, I affix my signature at Cincinnati, Ohio, this 28th day of August, 1922.

HERBERT E. TWITCHELL.